Jan. 28, 1947. M. P. MATUSZAK 2,414,884
PURIFICATION OF HYDROFLUORIC ACID
Filed Oct. 29, 1943
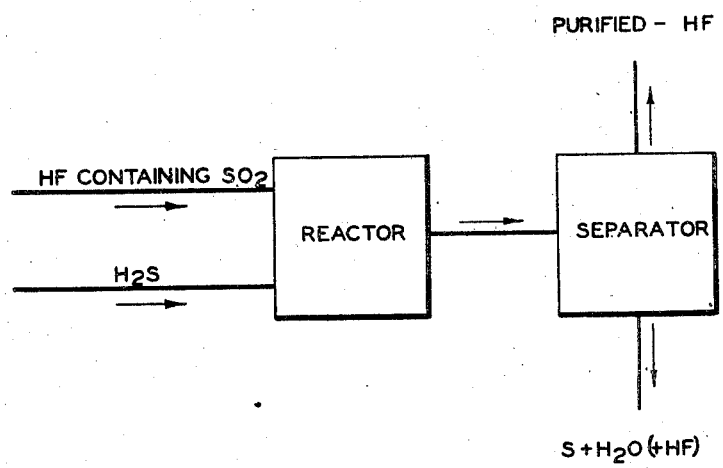
INVENTOR
M.P. MATUSZAK
BY Hudson, Young & Yinger
ATTORNEYS Patented Jan. 28, 1947

2,414,884

UNITED STATES PATENT OFFICE 2,414,884

PURIFICATION OF HYDROFLUORIC ACID

Maryan P. Matuszak, Bartlesville, Okla., assignor to Phillips Petroleum Company, a corporation of Delaware Application October 29, 1943, Serial No. 508,165

6 Claims. (Cl. 23—153)

This invention relates to a process for the purification of hydrofluoric acid.

The object and purpose of this invention is to purify hydrofluoric acid by substantially complete reduction of sulfur dioxide to sulfur and separation from the resulting sulfur.

Hydrofluoric acid, as commercially prepared by the action of concentrated sulfuric acid on fluorspar or fluorite or similar minerals, always contains a small proportion of sulfur dioxide, which in the best grade of commercial anhydrous hydrofluoric acid usually is not more than 0.1 per cent by weight, but sometimes is of the order of 0.5 to 1 per cent or more. When the hydrofluoric acid is to be used as a catalyst for effecting conversion of organic compounds, the presence of sulfur dioxide in the acid is undesirable. The sulfur becomes concentrated in the product of the catalytic conversion, thereby increasing the corrosiveness of the product, decreasing the octane number and/or lead response of the product (if a motor fuel), and necessitating a considerable expense for desulfurization of the product. It has been previously proposed to remove sulfur dioxide from hydrofluoric acid by simple fractional distillation or by fractional distillation in the presence of an added hydrocarbon which removes the sulfur dioxide as a low-boiling azeotropic mixture or which combines with the sulfur dioxide to form a relatively high-boiling organic sulfur compound. However, such processes are relatively time-consuming and expensive since they require rather efficient fractionating equipment.

According to this invention, the sulfur dioxide is reduced to sulfur, from which the hydrofluoric acid is separated relatively easily. Although any effective reducing agent may be employed, I prefer to use hydrogen sulfide, since it has the advantages of being relatively inexpensive and of forming only water as a principal by-product, according to the equation:

$$2H_2S + SO_2 \rightarrow 3S + 2H_2O$$

Furthermore, when an excess of hydrogen sulfide is used, this excess can be readily removed and recovered by fractional distillation, since the boiling point of hydrogen sulfide is about 81° C. below that of hydrofluoric acid.

Although the advantages of this invention may be obtained under many different conditions, ordinarily the approximately stoichiometrical equivalent of hydrogen sulfide necessary to react with the sulfur dioxide present (as determined by analysis) is added to the hydrofluoric acid under conditions of temperature and pressure that maintain the hydrofluoric acid in the liquid phase. The reaction proceeds rapidly, especially when good mixing is practiced, and sulfur is precipitated. The hydrofluoric acid is then separated from the precipitated sulfur by any suitable means, as by coagulation of the sulfur and filtering; usually, however, the separation is most conveniently effected by flashing or distilling off the hydrofluoric acid, whereby it is simultaneously freed from the by-product water, which remains as a kettle product in the form of a maximum-boiling azeotropic mixture containing roughly 40 per cent hydrofluoric acid. The resulting sulfur dioxide-free hydrofluoric acid may be subsequently used for any desired purpose, such as, for example, as a catalyst for hydrocarbon-conversion reactions.

The treatment with the hydrogen sulfide may be conducted at any temperature at which the above reaction will take place. This may range from −40° C. or even lower to +100° C. or even higher. While it is preferred to conduct the treatment with the hydrofluoric acid in liquid phase, under some circumstances it may be in the vapor phase. Vapor phase treatment may be carried out at temperatures ranging from just above the boiling point of the HF to 100° C. or even preferred.

Reducing agents other than hydrogen sulfide, such as hydrogen iodide, cuprous salts, mercurous salts, stannous salts, and the like, may be similarly used, but they usually introduce one or more chemical elements into the hydrofluoric acid that may or may not be tolerated; furthermore, they are usually more expensive than hydrogen sulfide.

The accompanying drawing, which is self-explanatory, illustrates diagrammatically the process of this invention.

Example I

A mixture consisting of 70 grams of hydrofluoric acid and 17.3 grams of sulfur dioxide was placed in a nickel crucible and 4.5 grams of hydrogen sulfide was added. The mixture was kept at Dry Ice temperature for 30 minutes and was then evaporated by raising the temperature; the time required for complete evaporation was 30 minutes. The residue of sulfur weighed 6.3 grams, which corresponds closely to the calculated amount of 6.4 grams of sulfur equivalent to the hydrogen sulfide added. Although in this instance, insufficient hydrogen sulfide was added to reduce all of the sulfur dioxide to sulfur, in actual practice at least the stoichiometrically required amount is added; any excess hydrogen sulfide is preliminarily removed by any suitable means, preferably by fractional distillation; and then the hydrofluoric acid is separated from the precipitated sulfur, preferably by distillation in a column that has only the few plates needed to effect separation of anhydrous hydrofluoric acid as an overhead product from the constant-boiling aqueous hydrofluoric acid as a kettle product.

Example II

To 3435 grams of anhydrous hydrofluoric acid containing 0.216 per cent by weight of sulfur dioxide, in a steel cylinder at room temperature, was added 7.84 grams of hydrogen sulfide. The cylinder was shaken and was allowed to stand overnight. Then a sample was analyzed for sulfur dioxide iodometrically; the iodine consumed corresponded to a sulfur dioxide content of 0.049 per cent by weight, but a qualitative test (precipitation of yellow cadmium sulfide) showed that a little hydrogen sulfide, which also consumes iodine, was still present. On the next day, the qualitative test for hydrogen sulfide was negative, and the iodometric analysis showed only 0.031 per cent by weight of sulfur dioxide. The sulfur formed from the reaction between sulfur dioxide and hydrogen sulfide settled readily, for a sample withdrawn from the cylinder in inverted position left a sulfur residue on evaporation whereas a sample withdrawn from the cylinder in horizontal position left no residue.

In many instances, complete removal of sulfur dioxide from the hydrofluoric acid is not necessary, provided that the sulfur dioxide is reduced to below a content that can be tolerated. In such instances, it is preferred to use a proportion of hydrogen sulfide that is not in excess but is sufficient only to reduce the sulfur dioxide to below the tolerable content, as thereby there is no possibility of having an excess of hydrogen sulfide, which may be undesirable and require subsequent removal.

Instead of flashing or fractionally distilling the hydrofluoric acid from the precipitated sulfur, a method that sometimes is preferred is that of letting the sulfur settle and then decanting off or drawing off the clear hydrofluoric acid. Another method that is at times useful is that of filtering off the sulfur, as by passing the mixture through an inert filtering bed, such as a bed of broken pieces or granules of sulfur or of carbon arranged in layers of graduated particle size. Although in these methods the hydrofluoric acid retains the by-product water, the content of water thus retained can frequently be tolerated in commercial processes using hydrofluoric acid, so that these methods are usually satisfactory. They have the advantage of not requiring a flashing or fractional-distillation column, operation of which consumes time and energy. Furthermore, in these methods the sulfur is recovered in a finely divided form that makes it valuable for use as a fungicide and an insecticide.

Since the invention may be practiced otherwise than as specifically described, it should be restricted only in accordance with the appended claims.

I claim:

1. The process of removing sulfur dioxide from anhydrous hydrofluoric acid contaminated therewith which comprises treating said acid with hydrogen sulfide in amount at least stoichiometrically equal to the amount of sulfur dioxide in said acid and thereby effecting reduction of said sulfur dioxide to sulfur by said hydrogen sulfide, and separating the so purified hydrofluoric acid from said sulfur.

2. The process of removing sulfur dioxide from anhydrous hydrofluoric acid contaminated therewith which comprises treating said acid with hydrogen sulfide and thereby effecting reduction of said sulfur dioxide to sulfur, and separating the so purified hydrofluoric acid from said sulfur.

3. The process of removing sulfur dioxide from anhydrous hydrofluoric acid contaminated therewith which comprises treating said acid with hydrogen sulfide in amount at least stoichiometrically equal to the amount of sulfur dioxide in said acid under conditions of temperature and pressure such that the hydrofluoric acid remains in liquid phase and thereby effecting reduction of said sulfur dioxide to sulfur and precipitation of said sulfur, and vaporizing sulfur dioxide-free hydrofluoric acid away from said sulfur.

4. The process of removing sulfur dioxide from anhydrous hydrofluoric acid contaminated therewith which comprises treating said acid with hydrogen sulfide in amount at least stoichiometrically equal to the amount of sulfur dioxide in said acid under conditions of temperature and pressure such that the hydrofluoric acid remains in liquid phase and thereby effecting reduction of said sulfur dioxide to sulfur and precipitation of said sulfur, allowing said sulfur to settle, and decanting off the clear sulfur dioxide-free hydrofluoric acid.

5. The process of removing sulfur dioxide from anhydrous hydrofluoric acid contaminated therewith which comprises treating said acid with hydrogen sulfide in amount at least stoichiometrically equal to the amount of sulfur dioxide in said acid under conditions of temperature and pressure such that the hydrofluoric acid remains in liquid phase and thereby effecting reduction of said sulfur dioxide to sulfur and precipitation of said sulfur, and vaporizing sulfur dioxide-free and substantially anhydrous hydrofluoric acid away from said sulfur and a maximum-boiling azeotrope formed by the by-product water with hydrofluoric acid.

6. The process of removing sulfur dioxide from anhydrous hydrofluoric acid contaminated therewith which comprises treating said acid with hydrogen sulfide in stoichiometric excess over the sulfur dioxide in said acid under conditions of temperature and pressure such that the hydrofluoric acid remains in liquid phase and thereby effecting reduction of said sulfur dioxide to sulfur and precipitation of said sulfur, fractionally distilling the excess of hydrogen sulfide and removing it overhead from the resulting mixture, and fractionally distilling sulfur dioxide-free and substantially anhydrous hydrofluoric acid and removing it overhead from the said sulfur and from the maximum-boiling azeotrope formed from the by-product water with hydrofluoric acid.

MARYAN P. MATUSZAK.

Certificate of Correction

Patent No. 2,414,884.  January 28, 1947.

MARYAN P. MATUSZAK

It is hereby certified that error appears in the printed specification of the above numbered patent requiring correction as follows: Column 2, line 27, after "even" insert the words *higher. In liquid phase, room temperature is*; and that the said Letters Patent should be read with this correction therein that the same may conform to the record of the case in the Patent Office.

Signed and sealed this 15th day of April, A. D. 1947.

[SEAL]

LESLIE FRAZER,
*First Assistant Commissioner of Patents.*